United States Patent [19]

Ozeki

[11] Patent Number: 5,632,376
[45] Date of Patent: May 27, 1997

[54] FILM SLIDE STORING DEVICE

[75] Inventor: Jiro Ozeki, Tokyo, Japan

[73] Assignee: Slidex Corporation, Tokyo, Japan

[21] Appl. No.: 442,224

[22] Filed: May 16, 1995

[30] Foreign Application Priority Data

May 17, 1994 [JP] Japan .................................. 6-102419
Apr. 26, 1995 [JP] Japan .................................. 7-102070

[51] Int. Cl.⁶ .................................................. G03B 21/64
[52] U.S. Cl. ............................................. 206/456; 40/704
[58] Field of Search ......................... 40/405, 700–707; 206/232, 455, 456

[56] References Cited

U.S. PATENT DOCUMENTS

| 3,666,599 | 5/1972 | Obeda . | |
|---|---|---|---|
| 3,866,648 | 2/1975 | Anderson | 206/456 |
| 4,263,357 | 4/1981 | Holson . | |
| 4,333,254 | 6/1982 | Stevenson | 40/701 |
| 4,508,224 | 4/1985 | Weber et al. | 206/455 |
| 4,602,714 | 7/1986 | Ozeki | 206/455 |
| 4,629,070 | 12/1986 | Roberg | 206/455 |
| 5,000,319 | 3/1991 | Mermelstein | 40/704 |
| 5,140,764 | 8/1992 | O'Connor | 40/704 |

FOREIGN PATENT DOCUMENTS

0574210A1  12/1993  European Pat. Off. .

Primary Examiner—Jimmy G. Foster
Attorney, Agent, or Firm—Keck, Mahin & Cate

[57] ABSTRACT

A film storing device is provided for storing a plurality of film assembly each including an image bearing film which is attached to a sheet-like mount. The film storing device comprises a pair of translucent sheet materials which are laid one over the other and bonded together along bonding areas including a plurality of longitudinally extending bonding areas and a plurality of transversely extending bonding areas defining a plurality of substantially rectangular storing sections to form a storing pocket in each of the storing sections between the pair of the translucent sheet materials. One of the sheet materials is formed with cutouts for forming an inlet to each storing pocket. A translucent image area is formed in each of the storing sections so that image on the film of the film assembly stored in the storing pocket can be visually observed through the pair of translucent sheet materials. A light transmission preventing region is formed around the image area by a coating, formed on at least one of the pair of translucent sheet materials, of a material which is capable of at least absorbing light passing through the translucent sheet materials. The pair of translucent sheet materials are bonded together in the bonding areas by a pattern of small discontinuous bonding points.

9 Claims, 4 Drawing Sheets

FILM SLIDE STORING DEVICE

BACKGROUND OF THE INVENTION

1. Field of the Invention

The present invention relates to a film storing sheet-like device for storing film assemblies each comprising an image bearing film attached to a film mount made of a cardboard, such as film slides. More particularly, the present invention pertains to a film storing device adapted to store one or more film assemblies, such as film slides, in a manner that images on the films can be seen through the storing device. The present invention further relates to a method for manufacturing such film storing device.

2. Prior Art

Conventionally, in order to store a plurality of film assemblies, such as film slides, which include image bearing films mounted on mounts which are usually made of cardboard, sheet-shaped film storing devices have widely been used. Such film storing devices are made of transparent or semi-transparent material so that the films stored in the storing devices can be seen through the storing devices. For reducing cost for manufacturing the film storing devices, it is preferred to use two transparent or semi-transparent sheet materials which are laid one over the other and bonded together to form storing pockets in which film assemblies are inserted.

When it is desired to project on a screen any one of the films stored in the storing device by means of an optical projector, bright light may simultaneously be passed to the screen through regions between adjacent storing pockets. Such bright light may disturb observation of the image which is projected on the screen. In order to eliminate such problem, the regions between adjacent storing pockets may be provided with light blocking or absorbing areas which are designed to block or at least absorb the light passing through the regions. The light blocking or absorbing regions can be provided as described in the Japanese Laid-Open Utility Model Application No. Sho 60-152467 by coating one of the sheet materials at desired areas with a substance which will block or at least absorb the light passing through the storing device.

In a known method for manufacturing the aforementioned film storing device, two transparent or translucent sheet materials are first bonded together to form storing pockets and the coating of light blocking or reducing substance is provided in desired areas by for example a printing process. In this known method, the bonded storing sheets are fed one after another for carrying out the printing process. It has been found that such printing process is more expensive than a printing process wherein the printing is made directly on a sheet material which is drawn from a roll of the sheet material prior to the bonding process.

The problem may be solved by printing directly on one of the sheet materials as the sheet material is drawn form a roll of such material and superposing the other sheet material on the one sheet material to bond them together. However, the method is not satisfactory because the printed ink may be removed at least partially from the printed sheet material during the bonding process under the heat and/or pressure which will be applied to the sheet materials for bonding them together. Thus, the printed areas may become translucent when the film storing device has been finished and consequently the light may undesirably be passed through regions between the storing pockets.

SUMMARY OF THE INVENTION

The present invention has an object to overcome the problems described above.

Another object of the present invention is to provide a method and a structure for a film storing device wherein a pair of translucent sheet materials are laid one over the other and bonded together to form storing pockets, one of the sheet materials being coated with a light blocking or light absorbing material prior to the bonding process but removal of the coating material during the bonding process can substantially be eliminated.

According to the present invention, the above and other objects can be accomplished by a film storing device for storing at least one film assembly including an image bearing film which is attached to a sheet-like mount, said film storing device comprising a pair of translucent sheet materials which are laid one over the other and bonded together along bonding areas defining at least three peripheries of at least one substantially rectangular storing section to form at least one storing pocket between said pair of the translucent sheet materials, one of said sheet materials being formed with at least one cutout for forming an inlet to the storing pocket, a translucent image area being formed in said storing section so that image on the film of the film assembly stored in said storing pocket can be visually observed through the pair of translucent sheet materials, a light transmission preventing region being formed around said image area by a coating, formed on at least one of said pair of translucent sheet materials, of a material which is capable of at least absorbing light passing through said translucent sheet materials, the pair of translucent sheet materials being bonded together in said bonding areas by a pattern of small discontinuous bonding points.

According to another aspect of the present invention, there is provided a film storing device for storing a plurality of film assembly each including an image bearing film which is attached to a sheet-like mount, said film storing device comprising a pair of translucent sheet materials which are laid one over the other and bonded together along bonding areas including a plurality of longitudinally extending bonding areas and a plurality of transversely extending bonding areas defining a plurality of substantially rectangular storing sections to form a storing pocket in each of the storing sections between said pair of the translucent sheet materials, one of said sheet materials being formed with cutouts for forming an inlet to each storing pocket, a translucent image area being formed in each of said storing sections so that image on the film of the film assembly stored in said storing pocket can be visually observed through the pair of translucent sheet materials, a light transmission preventing region being formed around said image area by a coating, formed on at least one of said pair of translucent sheet materials, of a material which is capable of at least absorbing light passing through said translucent sheet materials, the pair of translucent sheet materials being bonded together in said bonding areas by a pattern of small discontinuous bonding points.

The present invention further provides a method for manufacturing a film storing device for storing at least one film assembly including an image bearing film which is attached to a sheet-like mount, the method including steps of providing a pair of translucent plastic sheet materials, placing one of the sheet materials over the other, bonding together said pair of translucent sheet materials along bonding areas to define at least three peripheries of at least one substantially rectangular storing section to form at least one storing pocket between said pair of the translucent sheet materials, one of said sheet materials being formed prior to said placing step at least one cutout for providing an inlet to the storing pocket, a translucent image area being formed in said storing section so that image on the film of the film assembly stored in said storing pocket can be visually observed through the pair of translucent sheet materials, coating prior to said placing step at least one of said translucent sheet materials around said image area with a material which is capable of at least absorbing light passing through said translucent sheet materials to form a light transmission preventing region, the pair of translucent sheet materials being bonded together in said bonding areas by a pattern of small discontinuous bonding points.

According to the features of the present invention, the paired translucent sheet materials are bonded together after the light transmission preventing areas are formed in at least one of the sheet materials. However, since the sheet materials are bonded together by means of a pattern of small discontinuous bonding points, the coatings of the light transmission preventing areas are not seriously damaged as compared with a bonding process wherein the sheet materials are bonded together through a large continuous area. Even if the coating is damaged, the damage will be restricted in extremely small, limited zones. Opaque or substantially opaque areas will still be retained even under such damage so that the light transmission preventing function will be maintained. The size of the discontinuous bonding point may preferably be 2 mm or less, more preferably, 1 mm or less.

The invention will now be described with reference to a preferable embodiment taking reference to the accompanying drawings.

DESCRIPTION OF THE PREFERRED EMBODIMENT

Figure 1:
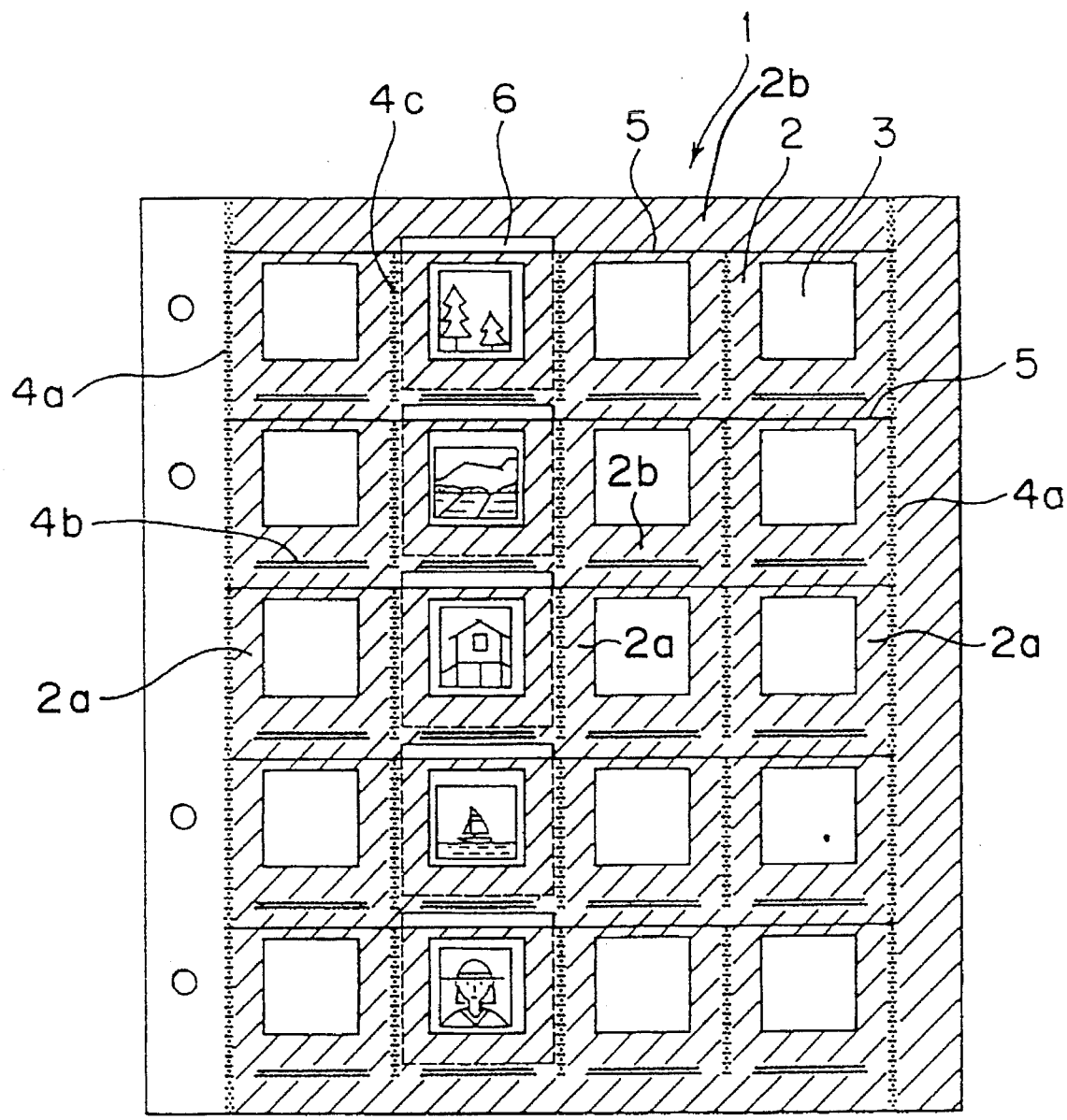
FIG. 1 is a plan view of a film slide storing sheet in accordance with one embodiment of the present invention.

Referring to the drawings, particularly to FIG. 1, there is shown a film slide storing sheet-like device 1 in accordance with one embodiment of the present invention. The storing device 1 is made of a pair of transparent sheet materials including a front side transparent sheet material 1a and a back side transparent sheet material 1b. The sheet material is described herein as being a transparent one, however, a semi-transparent sheet may also be used in the present invention. Therefore, the term "translucent" is used to include both the transparent and semi-transparent property.

The transparent sheet materials 1a and 1b are laid one over the other and bonded together. The front side sheet material 1a of the storing sheet 1 is formed with a light transmission preventing region 2 which, in the present embodiment, is formed by a lattice-like pattern coating of a light absorbing or light blocking material. The lattice-like pattern of coating includes a plurality of longitudinally extending band-shaped portions 2a and a plurality of transversely extending band-shaped portions 2b which are crossing each other. The light transmission preventing region 2 encompasses a plurality of image areas 3 which are arranged in a plane in rows and columns. In a row, there are a plurality of image areas 3 arranged in a longitudinal direction of the storing sheet 1, whereas in a column, there are a plurality of image areas 3 arranged in a transverse direction of the storing sheet 1.

The front side sheet material 1a and the back side sheet material 1b are bonded together by means of a suitable bonding technique such as a heat seal along opposite longitudinally extending side edge portions to form bonding areas 4a. In order to provide partitions between each longitudinally adjacent image areas 3, the front side sheet material 1a and the back side sheet material 1b are bonded together along transverse bonding areas 4b. In the illustrated structure, the bonding areas 4b are in the form of intermittent discontinuous lines. It should however be noted that transversely adjacent bonding areas 4b may be defined by a transversely continuous line.

Between transversely adjacent image areas 3, the front side sheet material 1a and the back side sheet material 1b are bonded together along a longitudinal bonding areas 1c. Here again, the longitudinal bonding areas 4c may be defined by intermittent longitudinal lines as illustrated or by continuous longitudinal lines.

In each image area 3, the front side sheet material 1a is formed at the upper edge portion of the image area 3 with a transversely extending cutout 5 which is located below the transversely extending bonding area 4b which is separating the subject image area 3 from an upwardly adjacent image area 3. The cutout 5 is in this particular embodiment in the form of a continuous line so that the cutout is formed in common for all of the transversely adjacent image areas 3. It should however be noted that the cutout 5 may be formed intermittently or separately for each image area 3. The cutout 5 defines an inlet for a film slide 6. As well known in the art, a film slide includes an image bearing film such as a photographic film attached to a sheet-like film mount usually made of a cardboard. A pocket 7 is formed in a film slide storing section which is defined by bonding areas around the image area 3 for storing the film slide 6.

Figure 2:
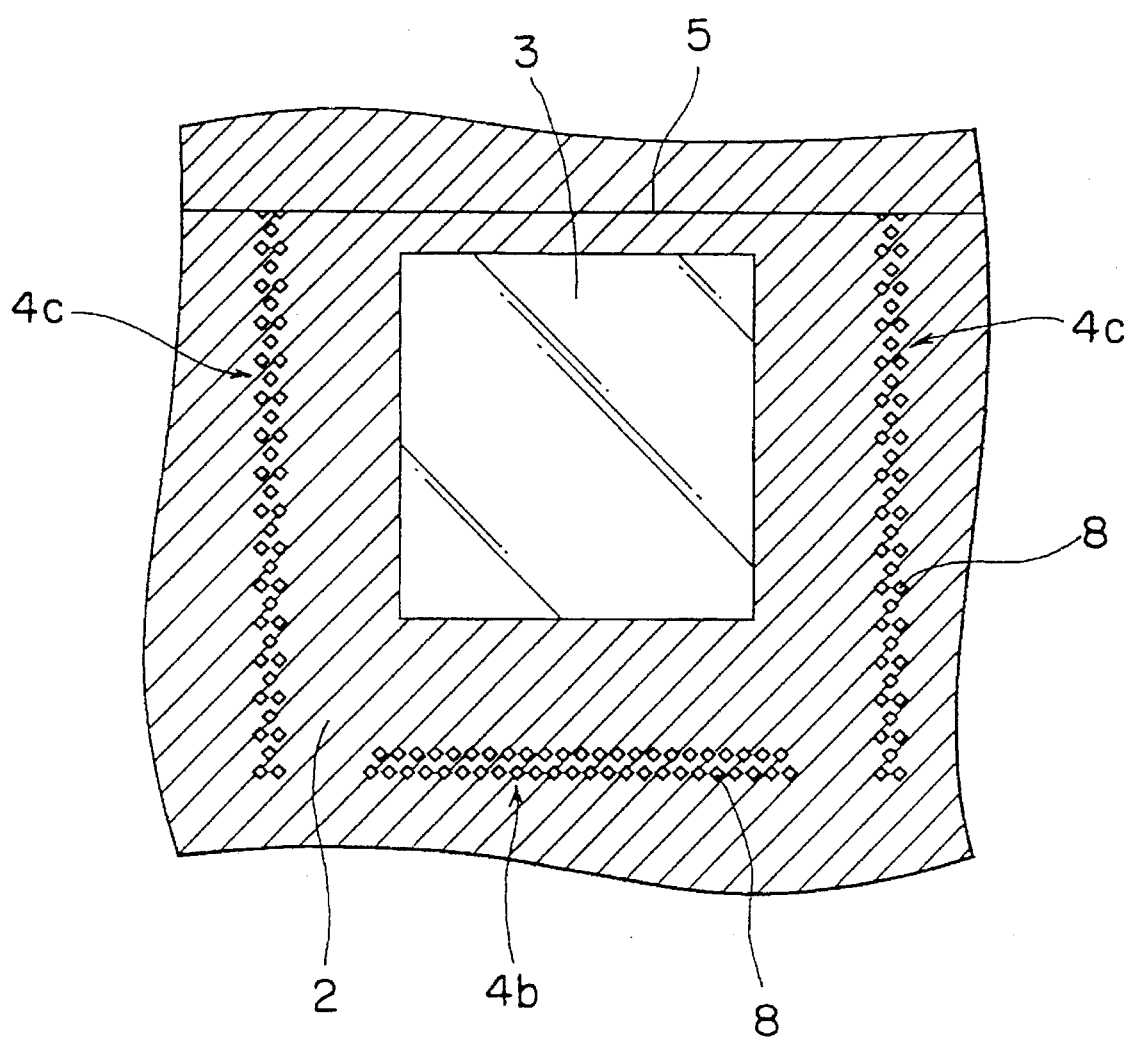
FIG. 2 is an enlarged fragmentary plan view showing a storing section having an image area of the film slide storing sheet shown in FIG. 1.
Figure 3:
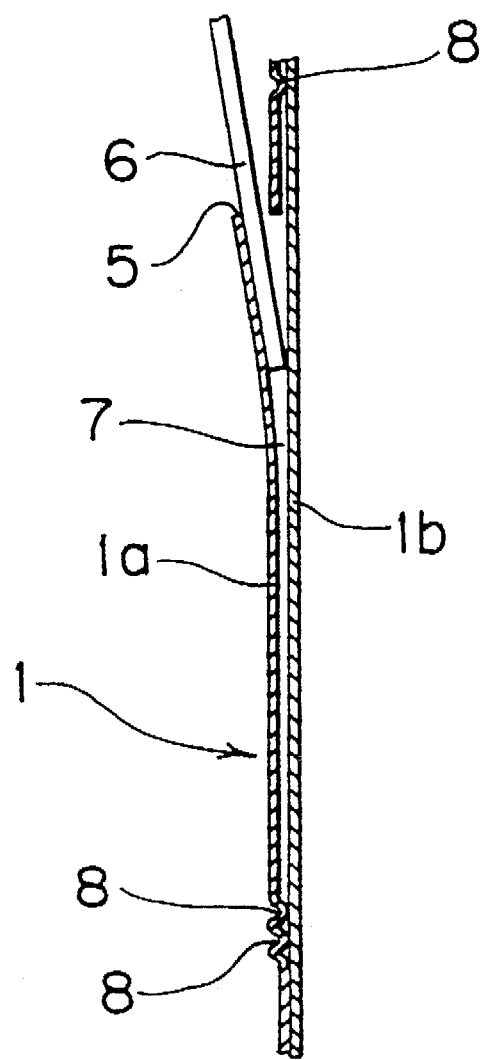
FIG. 3 is a sectional view of the portion of the film slide storing sheet shown in FIG. 2; and, FIG. 4 is a side view showing one example of a mould adapted to be used in manufacturing the film slide storing sheet in accordance with the present invention.
Figure 4:
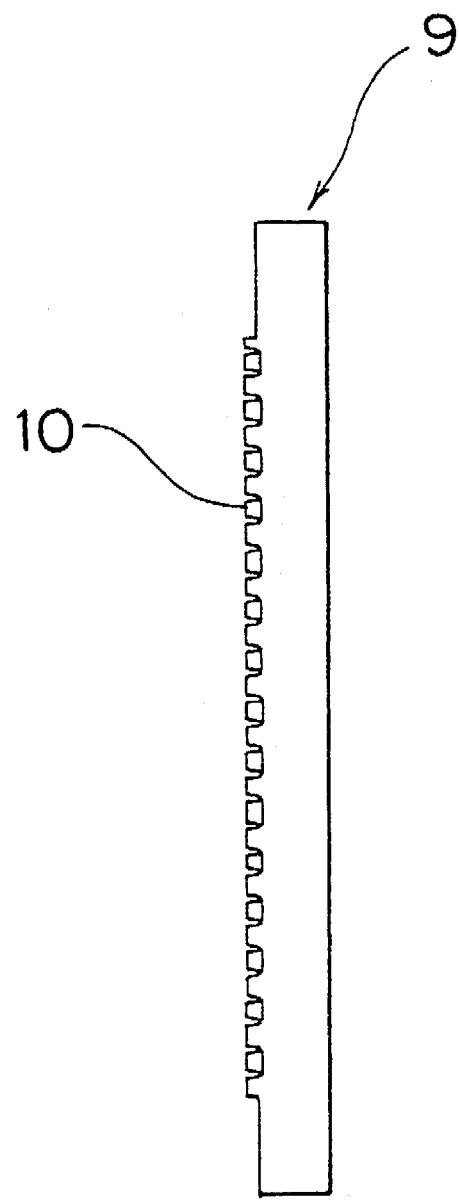

Referring now to FIG. 2, there are shown details of the bonding areas. Each of the bonding areas 4b and 4c are formed by an elongated band-shaped pattern of a plurality of small discontinuous dotted bonding points 8. It is preferred that the size of the dotted bonding point 8 is 2 mm or less, more preferably 1 mm or less.

The film slide storing device 1 in accordance with the illustrated embodiment of the present invention is made of transparent plastic sheet materials supplied in the form of rolls. The back side sheet material 1b is used as the sheet material is pulled out from the roll. The front side sheet material 1a is subjected to a printing process as the material is pulled out of the roll to provide the light transmission preventing region 2. The printing of the light transmission preventing region 2 is directly performed on the sheet material as it is pulled out of the roll so that the pattern of the region 2 can be formed very easily and economically through a conventional printing technique.

Then, the front side sheet material 1a is subjected to a cutting process wherein the aforementioned cutouts 5 are appropriately formed. The front side sheet material 1a is then laid over the back side sheet material 1b and bonded thereto by for example heat seal. For carrying out the bonding process, a mould 9 is provided at one side of the over-laid sheet materials 1a and 1b. The mould 9 has a band-shaped pattern of dots or projections 10. A heated plate (not shown) is provided at the side of the sheet materials 1a and 1b opposite to the mould 9 and used to force the sheet materials 1a and 1b to the mould 9 so that the sheet materials 1a and 1b are bonded together under heat applied by the heated plate in a pattern corresponding to the pattern of dots 10 on the mould 9.

In the bonding process, the sheet materials 1a and 1b are partially molten so that the printed pattern of the light absorbing or light blocking material which has been formed on the front side sheet materials 1a may be partially dissipated. However, the bonded areas are small and distributed with spaces therebetween so that the light transmission preventing property can be maintained.

The invention has thus been shown and described with reference to a specific example, however, it should be noted that the invention is in no way limited to the illustrated structures but changes and modifications may be made without departing from the scope of the appended claims.

I claim:

1. A film storing device for storing at least one film assembly including an image beating film which is attached to a sheet-like mount, said film storing device comprising a pair of translucent sheet materials which are laid one over the other and bonded together along bonding areas defining at least three peripheries of at least one substantially rectangular storing section to form at least one storing pocket between said pair of the translucent sheet materials, one of said sheet materials being formed with at least one cutout for forming an inlet to the storing pocket, a translucent image area being formed in said storing section so that image on the film of the film assembly stored in said storing pocket can be visually observed through the pair of translucent sheet materials, a light transmission preventing region being formed around said image area by a coating, formed on at least one of said pair of translucent sheet materials, of a material which is capable of at least absorbing light passing through said translucent sheet materials, the pair of translucent sheet materials being bonded together in said bonding areas by a pattern of small discontinuous nonelongated bonding points.

2. A film storing device in accordance with claim 1 in which said coating is of a material which is capable of blocking the light passing through the pair of translucent sheet materials.

3. A film storing device in accordance with claim 1 in which a plurality of storing sections are defined in side-by-side relationship.

4. A film storing device for storing a plurality of film assembly each including an image bearing film which is attached to a sheet-like mount, said film storing device comprising a pair of translucent sheet materials which are laid one over the other and bonded together along bonding areas including a plurality of longitudinally extending bonding areas and a plurality of transversely extending bonding areas defining a plurality of substantially rectangular storing sections to form a storing pocket in each of the storing sections between said pair of the translucent sheet materials, one of said sheet materials being formed with cutouts for forming an inlet to each storing pocket, a translucent image area being formed in each of said storing sections so that image on the film of the film assembly stores in said storing pocket can be visually observed through the pair of translucent sheet materials, a light transmission preventing region being formed around said image area by a coating, formed on at least one of said pair of translucent sheet materials, of a material which is capable of at least absorbing light passing through said translucent sheet materials, the pair of translucent sheet materials being bonded together in said bonding areas by a pattern of small discontinuous nonelongated bonding points.

5. A film storing device in accordance with claim 4 in which each of said bonding points is of a size not larger than 2 mm.

6. A film storing device in accordance with claim 4 in which each of said bonding points is of a size not larger than 1 mm.

7. A film storing device in accordance with claim 4 in which said bonding points are distributed in a band-shaped pattern.

8. A film storing device in accordance with claim 7 in which said band-shaped pattern is formed intermittently between transversely adjacent storing sections.

9. A film storing device in accordance with claim 7 in which said band-shaped pattern is formed intermittently between longitudinally adjacent storing sections.

* * * * *